W. E. SMITH.
METHOD OF MAKING CATNIP BALLS.
APPLICATION FILED APR. 8, 1911.
1,031,095.
Patented July 2, 1912.
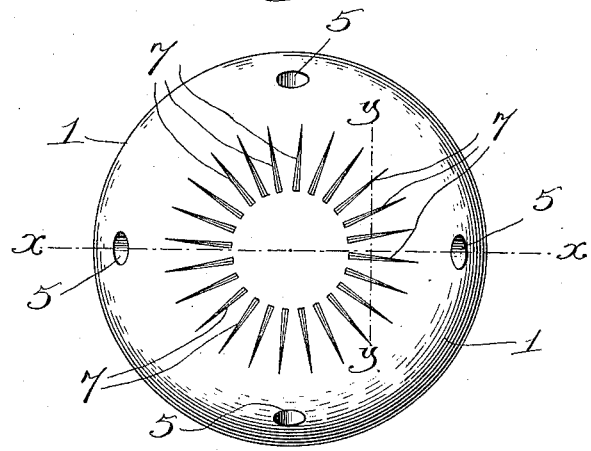
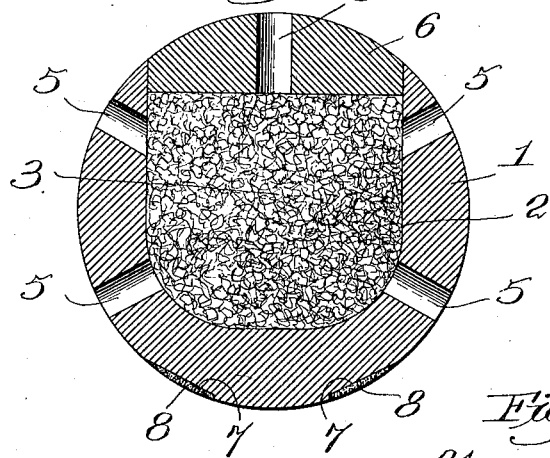
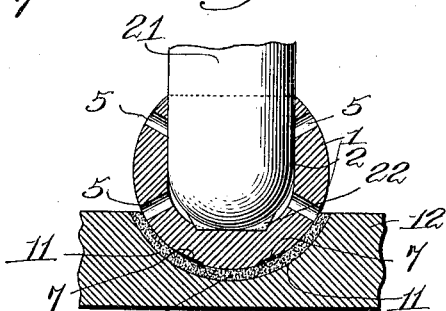
Witnesses.
Thomas Drummond
Warren O'Neil
Inventor.
Walter E. Smith,
by Edwards Heard & Smith
Attys.

UNITED STATES PATENT OFFICE.

WALTER E. SMITH, OF BOSTON, MASSACHUSETTS, ASSIGNOR TO CHARLES C. ROGERS, OF WINCHESTER, MASSACHUSETTS.

METHOD OF MAKING CATNIP-BALLS.

1,031,095.     Specification of Letters Patent.     Patented July 2, 1912.

Application filed April 8, 1911. Serial No. 619,683.

*To all whom it may concern:*

Be it known that I, WALTER E. SMITH, a citizen of the United States, residing at Boston, county of Suffolk, and State of Massachusetts, have invented an Improvement in Methods of Making Catnip-Balls, of which the following description, in connection with the accompanying drawing, is a specification, like characters on the drawing representing like parts.

This invention relates to catnip balls of that general type shown in my Patent No. 848,136, dated March 26, 1907, and which comprise a body adapted to roll and provided with an internal chamber or cavity containing catnip or similar material, and also provided with apertures leading to said chamber through which the catnip odor escapes.

The object of the present invention is to provide a novel method of making such a catnip ball by which method a portion at least of the exterior surface of the ball will be impregnated with catnip odor or catnip compound.

In the preferred way of carrying out my invention I form the exterior surface of the catnip ball with a series of indentations and then I move the indented portion of the catnip ball over a bed of catnip material while applying pressure to the catnip ball, so that the catnip material becomes ground into the indentations and also into the material of the body somewhat. The result is that the catnip ball has a much greater fragrance than if the catnip were simply contained in the internal cavity and also that the cat is enabled to taste the catnip by licking the exterior surface of the ball as could not be done if the catnip were confined entirely within the cavity.

Referring to the drawings wherein I have shown a selected embodiment of my invention which is sufficient to illustrate the principle thereof, Figure 1 is a view of the catnip ball completed; Fig. 2 is a section on the line *x—x*, Fig. 1; Fig. 3 is a section on the line *y—y*, Fig. 1; Fig. 4 shows one step in the process of manufacturing my improved ball.

The catnip ball herein shown comprises a body 1 having an interior cavity 2 adapted to be filled with catnip or similar material 3 and also provided with apertures 5 leading to the cavity 2 through which the odor of catnip can escape. The body 1 may have any suitable exterior shape, but will preferably be of a shape adapted to roll more or less readily. A spherical shape, such as shown in the drawings, has the advantage that it will readily roll in any direction, although a cylindrical or elliptical shape might be successfully employed.

The general features of the catnip ball herein shown are similar to those shown in my former Patent No. 848,136 and the ball is made by forming an axially-extending bore into the body 1 and after filling said bore with catnip closing the open end thereof by a plug 6. This particular way of forming ball, however, is not essential to the invention.

I find that it is of advantage to have these catnip balls so made that the cat can obtain the taste of catnip by licking the exterior of the ball and also so that the ball will give off a stronger catnip odor than would naturally be obtained through the apertures 5. Accordingly, I propose to make the catnip ball so that the catnip material will be exposed on a portion at least of the surface of the ball. One convenient way of accomplishing this is to form the ball with a plurality of indentations 7 which may be of any size or shape and then to fill these indentations with catnip material 8. In the embodiment shown I arrange a row of radially-extending indentations 7 which can conveniently be made by subjecting the ball to the action of a properly-shaped die which will press into the material of the body 1 and form the indentations therein. While these catnip balls may be made of any material which can be readily indented in this way, I prefer to use wood, as I find that this material can not only be readily indented, but the wood has the characteristic of helping to retain the catnip material in the indentations. After the indentations 7 have been thus made they may be filled with catnip material in any suitable way. I prefer, however, to place the indented portion of the ball on a body 9 of catnip material, as shown in Fig. 4, and then to move said ball over the bed of catnip material while subjecting the ball to pressure. If the catnip ball has a spherical shape, as shown, the catnip material 9 may be placed in a concave recess 11 in a bed 12 and after placing the indented portion of the ball on the bed 9 of catnip material within the recess 11 said ball may be turned about its vertical axis and at the same time subjected to downward pressure, such movement operating to grind the catnip material between the ball and the plate 12 and thus force the catnip material into the indentations 7 and also cause any oil or juice in the catnip material to fill the pores of the wood more or less. The result will be that a portion of the exterior surface of the catnip ball will become impregnated with the catnip, and this portion of the ball will have a strong catnip odor because of the fact that the catnip material has been ground or crushed against the ball during the turning movement thereof. A catnip ball made in this way is much more attractive to cats than if the only catnip odor which could be obtained from the ball was that which escaped through the apertures 5. Moreover the cat can get the taste of catnip somewhat by merely licking the indented portion of the ball.

The ball may be revolved so as to fill the indentations with catnip material by any suitable mechanism. In Fig. 4 I have shown a rotating spindle 21 which is capable of longitudinal movement somewhat after the manner of the shaft of an ordinary upright drill. This spindle is provided at its lower end with a blade 22 which is adapted to engage the bottom of the cavity 2 when the spindle is inserted thereinto. By lowering the spindle into the cavity until the blade engages the cavity bottom, the rotary motion of the spindle will be communicated to the ball which will then be spun over the bed 9 of catnip material under any desired pressure.

Having fully described my invention, what I claim as new and desire to secure by Letters Patent is:—

1. The steps in the process of making a catnip ball which consist in forming a chambered body of some porous material such as wood, providing said body with indentations or recesses on its exterior face, pressing the indented portion of the body against a body of catnip and moving the indented portion over the body of catnip while subjected to pressure whereby the oil compounds in the catnip are expressed and absorbed into the pores of the wood and the catnip material is forced into said indentations.

2. The steps in the process of making a catnip ball which consist in forming a chambered body of wood or similar porous material, pressing the exterior surface of said body against a body of catnip and rotating the body while thus subjected to pressure whereby the oils and juices of the catnip material are pressed therefrom and are absorbed into the pores of the wood.

3. The steps in the process of making a catnip ball which consists in forming a chambered body with indentations or recesses on its exterior surface, pressing the indented portion of the body against a body of catnip, and rotating the body while subjected to pressure whereby the catnip material is ground into said indentations.

4. The steps in the process of making a catnip ball which consists in forming a chambered body with indentations or recesses on its exterior surface, pressing the indented portion of the body against a body of catnip, and moving the indented portion of the body over the catnip material while subjected to pressure.

In testimony whereof, I have signed my name to this specification, in the presence of two subscribing witnesses.

WALTER E. SMITH.

Witnesses:
 LOUIS C. SMITH,
 THOMAS J. DRUMMOND.

Copies of this patent may be obtained for five cents each, by addressing the "Commissioner of Patents, Washington, D. C."